United States Patent [19]

Soeda

[11] 4,170,749
[45] Oct. 9, 1979

[54] SPEED CONTROL CIRCUIT FOR A SERIES MOTOR

[75] Inventor: Katsuji Soeda, Sukagawa, Japan

[73] Assignee: Yamamoto Electric Industrial Co., Ltd., Sukagawa, Japan

[21] Appl. No.: 826,650

[22] Filed: Aug. 22, 1977

[30] Foreign Application Priority Data

Sep. 16, 1976 [JP] Japan .................. 51-111030

[51] Int. Cl.² .................................. H02P 5/16
[52] U.S. Cl. ...................... 318/331; 318/345 CA; 318/345 G
[58] Field of Search ............... 318/345 CA, 345 AB, 318/345 H, 345 D, 331

[56] References Cited

U.S. PATENT DOCUMENTS

| 3,177,417 | 4/1965 | Wright | 318/331 |
| 3,518,520 | 6/1970 | Molnar | 318/331 |
| 3,619,752 | 11/1971 | Bateika | 318/331 |

Primary Examiner—David Smith, Jr.
Attorney, Agent, or Firm—Fleit & Jacobson

[57] ABSTRACT

A speed control circuit for a series motor is disclosed which keeps the rotational speed of a motor constant by detecting the slight change of an electromotive force caused by the change of the load motor. A gate signal from a trigger signal generating element is provided to the base of a thyristor connected in series with the series motor. The gate signal is controlled by a control circuit.

4 Claims, 1 Drawing Figure

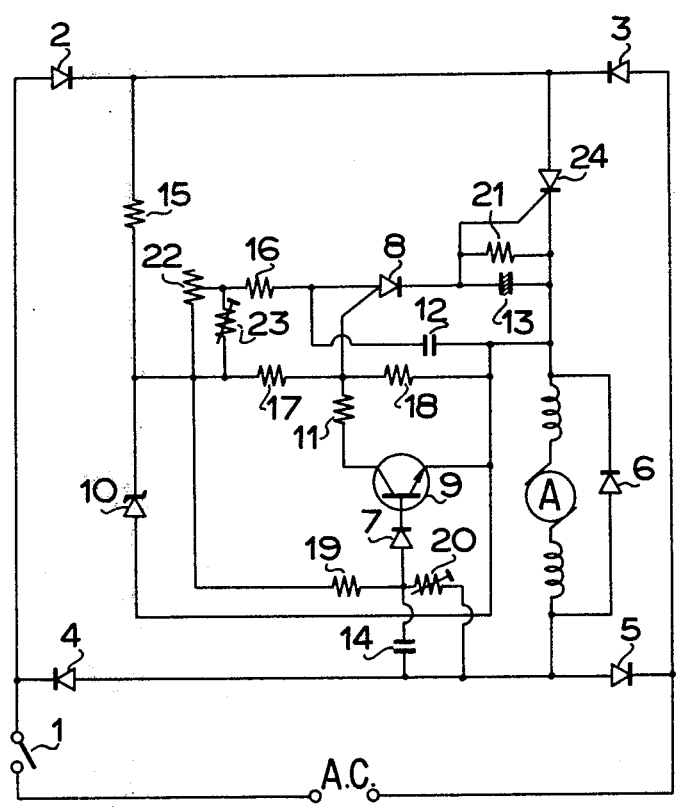

SPEED CONTROL CIRCUIT FOR A SERIES MOTOR

BACKGROUND AND SUMMARY OF THE INVENTION

This invention relates to a speed control circuit for a series motor which is designed to employ a feed back using the method of full wave rectification and phase control.

Two thyristors are used for the full wave rectification and phase control (the method of full wave rectification and phase control using a triac is thus excluded), and a rectifying element is connected in series with a magnetic field coil to magnify the motor feed-back signal which is used in this method. The motor which is especially assembled in this apparatus, not only has to be produced specially for this purpose, but also careful attention must be paid to the wiring in order to avoid producing polarity at the terminals of the motor. Therefore, the problem has existed that the motor cannot be mass-produced and the unit cost of production becomes expensive because the motor cannot be exchanged for a conventional motor.

The object of this invention is to provide a speed control circuit for a series motor in which one thyristor is connected in series with the series motor and a trigger signal generating element is used in a gate signal generating circuit for said thyristor. A feed-back circuit which can adapt to a conventional motor is employed.

BRIEF DESCRIPTION OF THE DRAWING

This invention will be explained referring to the accompanying drawing, in which:

A single FIGURE is the wiring diagram of the control circuit embodying the invention.

DETAILED DESCRIPTION OF THE DRAWING

In the drawing, a main switch 1 and a full wave rectifier which consists of four diodes 2,3,4 & 5 is provided between the terminals of an alternating current (A.C.) source of electricity. A series motor which is connected in series with a thyristor 24 and the series circuit is provided between the output terminals of the full wave rectifier. A trigger signal generating element 8 which is an N-type thyristor is connected to the gate terminal of the thyristor 24 to produce a gate signal thereto. The gate terminal of the trigger signal generating element 8 is connected with the electron collector terminal of a transistor 9 through a resistor 11 which adjusts the sensibility of feed-back. The base of the transistor 9 is connected with one end of the motor A through a diode 7 and a bias half-fixed resistor 20 i.e., a resistor that is half-fixed and half variable, and the emitter of the transistor 9 is connected with the gate of the trigger signal generating element 8 and the positive end of the motor A through a bias resistor 18. One end of a zener diode 10 is connected with the emitter of the transistor 9 and the other is connected with the gate of the trigger signal generating element 8 through a resistor 17. One end of a resistor 15 is connected with the zener diode 10 and the resistor 17 and the other is connected with the cathode of the rectifier 2. In this case, the diode 7 is provided to prevent backward flow of electricity, i.e., current through the transistor 9 when electricity is flowing through the thyristor 24, and to give a base bias to the transistor 9.

A half fixed resistor 20 is provided to select the most suitable bias resistance in accordance with the performance of the transistor 9. The zener diode 10 is the element of a constant voltage which gives a slice or clipped trapezoidal wave to the transistor 9 and the trigger signal generating element 8. The resistor 15 is a protective resistance of the zener diode 10, and the resistor 17 is a partial voltage resistor which divides the voltages at both ends or across the terminals of the zener diode into a suitable ratio with regard to the bias resistance 18.

Capacitor 12 accumulates charge to generate a trigger signal in the trigger signal generating element 8. A capacitor 13 prevents the incorrect actuation of the thyristor 24 caused by a noise and capacitor 14 prevents the incorrect actuation of the transistor 9 by noise originating when the rotational electromotive force is generated by a commutator through a brush of the motor.

A rectifier element 6 prevents the incorrect actuation of the thyristor 24 by absorbing the flash voltage which is generated at the terminals when the electric current is broken at the thyristor 24. A resistor 16 is the protective resistance of the trigger signal generating element 8 when the resistance of a variable resistor 22 is zero. The resistor 22 changes selectively the time when the trigger signal generating element 8 reaches the breakover voltage, (i.e., the current carrying phase angle of the thyristor 24) and controls the rotational speed of the motor A from zero to maximum. Further, the half-fixed resistor 23 is used to exercise control so as that the trigger signal generating element 8 should reach the state immediately before the break over voltage when the resistance of the variable resistor 22 is maximum.

When the main switch 1 is closed, the positive voltage which is full wave rectified by the rectifier acts on the zener diode 10 through the resistor 15 and is sliced or clipped to a trapezoidal wave shape which is impressed on the series connection of the resistors 17 and 18.

Thus, the voltage divided across the resistor 18 is impressed between the gate and the cathode of the trigger generating element 8. The other voltage, i.e., the voltage across resistor 17, charges the capacitor 12 with charge, but the amount of the charged voltage cannot make the trigger generating element 8 produce the gate signal onto the thyristor 24, because the half-fixed resistor 23 is so set that the voltage should reach the state immediately before the break over voltage when the resistance of the variable condenser 22 is maximum.

At the point where the voltage drops suddenly after passing the constant voltage of the tapezoid wave voltage which is impressed between the gate and cathode of the trigger signal generating element 8, the break over voltage between the anode and the cathode of the element 8 is decreased due to the characteristic of the element 8 (the element 8 has the feature wherein the break over voltage between the anode and the cathode decreases when the voltage between the gate and the cathode is increased. Therefore, the element 8 is in the on state when voltage across the gate and cathode is increased. The electric charge of the condenser 12 is then discharged. But the electric current does not to flow through the thyristor 24 because the discharged current is small at this instant, and, moreover, the time of current flow is very short. The voltage of the source of electricity is also too small in this case to induce the motor A to rotate. When the resistance of the variable resistor 22 is decreased, the charged voltage of the condenser 12 reaches the break over voltage of the trigger signal generating element 8 and puts the gate signal into the thyristor 24 which reaches an "on" state and gives electromotive force to the motor A. The time of reaching the break over voltage of the trigger signal generating element 8 is changed when the resistance of the variable resistor is increased or decreased, and the current carrying phase angle is therefore changed.

The feed-back circuit will now be explained. The signal of feed-back used in this circuit is a known weak rotational electromotive force produced by the residual magnetization of the field core of a motor. This electromotive force is proportional to the rotational speed.

If a load torque is increased and a rotational speed is therefore decreased when the motor is rotating with a constant load torque, the rotational electromotive force produced by the residual magnetization which is proportional to the rotational speed is decreased.

The action of the transistor 9 will now be described. The voltage on both ends of the bias half-fixed resistor 20 is impressed between the base and the emitter of the transistor 9 until the rotational speed of the motor is changed. The rotational electromotive force by the residual magnetization is produced in the rotor because the motor A is contained in this circuit and the polarity of this electromotive force and the bias voltage are in opposite directions, so the true bias voltage impressed between the base and the emitter of the transistor 9 is the difference between the partial voltage across the half-fixed resistor 20 and the rotational electromotive force. The base current of the transistor 9 defined by that voltage. In other words, the equivalent resistance between the collector and the emitter of the transistor 9 is fixed according to the current value of the base and controls the gate voltage of the trigger signal generating element 8. The rotational electromotive force is decreased when the amount of rotation of the motor is decreased. Therefore the base current of the transistor 9 is increased and the equivalent resistance between the collector and the emitter is decreased and the gate voltage of the trigger signal generating element 8 is lowered. Then, the break over voltage is lowered and the current carrying phase angle of the trigger signal generating element 8, i.e., of the thyristor 24, is gained and this results in increasing the rotational speed of the motor. On the contrary, when the rotational electromotive force is increased when the load torque is decreased and the rotational speed of the motor is increased, the base current of the transistor 9 is decreased and the equivalent resistance between the collector and the emitter of the transistor 9 is increased and the gate voltage of the trigger signal generating element 8 is increased. Thus, the time of the action of the trigger signal generating element and the current carrying phase angle of the thyristor 24 is delayed and these result in decreasing the rotational speed of the motor.

As will be understtod from the foregoing, in the circuit of this invention, the slight change of the rotational electromotive force caused by the change of the load charged on the motor is transformed effectively to the change of the base current of the transistor 9 and magnified to control the gate voltage of the trigger signal generating element 8. The, the break over voltage is changed and the current carrying phase angle of the thyristor 24 is controlled for keeping constant the rotational speed of the motor.

Furthermore, in the circuit of this invention, a similar feed-back control can be made in the case of the motor in which the rectifying element is connected in parallel with the magnetic field coil.

What is claimed is:

1. A speed control circuit for a series motor comprising a thyristor means for controlling electric current supplied to said series motor, said thyristor means disposed between the output terminals of a full wave rectifying circuit and connected in series with said series motor; a trigger signal generating means for providing a gate signal to a base of said thyristor means; a transistor connected in parallel with said trigger signal generating means to control the break over voltage of said signal generating means, a Zener diode connected across one of said output terminals and the emitter of said transistor and also connected to the gate of said trigger signal generating means for producing a clipped trapezoidal voltage waveform to said gate of said trigger signal generating means, and connecting means for connecting said transistor with said series motor in order that the equivalent resistance between the collector and the emitter of said transistor may be decreased and increased according to the rotational electromotive force of said motor, and means for impressing said electromotive force on the base of said transistor through a rectifier connected in the positive sense, whereby the equivalent resistance is decreased and increased when said impressed electromotive force is increased and decreased respectively.

2. Speed control circuit for a series motor as claimed in claim 1 wherein said connecting means comprises a bias half-fixed resistor provided between the base and the emitter of said transistor and in series with said motor.

3. Speed control circuit for a series motor as claimed in claim 1 further comprising a variable resistor means for selectively changing the time to attain the break over voltage of the trigger signal generating element.

4. Speed control circuit for a series motor as claimed in claim 3 wherein a half-fixed resistor is provided which exercises control so as that the trigger signal generating element becomes the state immediately before the break over voltage when the resistance of said variable resistor is maximum.

* * * * *